«12» United States Patent
Hung et al.

(10) Patent No.: US 6,980,350 B2
(45) Date of Patent: Dec. 27, 2005

(54) OPTICAL INTERFERENCE REFLECTIVE ELEMENT AND REPAIRING AND MANUFACTURING METHODS THEREOF

(75) Inventors: Po-Chung Hung, Pan Chiao (TW); Hsiung-Kuang Tsai, Taipei (TW); Wen-Jian Lin, Hsinchu (TW)

(73) Assignee: Prime View International Co., Ltd., Hsinchu (TW)

( * ) Notice: Subject to any disclaimer, the term of this patent is extended or adjusted under 35 U.S.C. 154(b) by 5 days.

(21) Appl. No.: 10/873,014

(22) Filed: Jun. 21, 2004

(65) Prior Publication Data

US 2005/0202649 A1 Sep. 15, 2005

(30) Foreign Application Priority Data

Mar. 10, 2004 (TW) ............................... 93106396 A (51) Int. Cl.[7] ........................... G02B 26/00; G02F 1/03; G09G 3/34

(52) U.S. Cl. ...................... 359/295; 359/291; 359/245; 345/84; 345/85; 345/108

(58) Field of Search ............................ 359/290, 291, 359/295, 245, 578; 345/45, 84, 85, 108, 815

(56) References Cited

U.S. PATENT DOCUMENTS

| | | | | |
|---|---|---|---|---|
| 5,488,505 A | * | 1/1996 | Engle | 359/292 |
| 5,493,439 A | * | 2/1996 | Engle | 359/292 |
| 6,034,807 A | * | 3/2000 | Little et al. | 359/227 |
| 6,055,090 A | * | 4/2000 | Miles | 359/291 |
| 6,195,196 B1 | * | 2/2001 | Kimura et al. | 359/295 |
| 6,211,853 B1 | * | 4/2001 | Takeuchi et al. | 345/108 |
| 6,466,354 B1 | * | 10/2002 | Gudeman | 359/247 |
| 6,585,379 B2 | * | 7/2003 | Yokoyama et al. | 353/31 |
| 6,642,913 B1 | * | 11/2003 | Kimura et al. | 345/84 |
| 6,650,461 B2 | * | 11/2003 | Atobe et al. | 359/291 |
| 6,680,792 B2 | * | 1/2004 | Miles | 359/291 |
| 6,930,816 B2 | * | 8/2005 | Mochizuki | 359/291 |

* cited by examiner

*Primary Examiner*—Loha Ben
(74) *Attorney, Agent, or Firm*—Thomas, Kayden, Horstemeyer & Risley (57) ABSTRACT

An optical interference reflective element has a light-incident electrode and a light-reflective electrode, and each or both of the two electrodes are made of a display part and a wiring part which are electrically connected to each other with a connection part. A plurality of the interference reflective elements are connected to form an electrode line by the wiring parts, and the electrode line is used in an optical interference reflective structure formed by the optical interference reflective elements that is operated in a passive matrix mode.

14 Claims, 8 Drawing Sheets

OPTICAL INTERFERENCE REFLECTIVE ELEMENT AND REPAIRING AND MANUFACTURING METHODS THEREOF

BACKGROUND

1. Field of Invention

The present invention relates to a display panel. More particularly, the present invention relates to an optical interference reflective element and repairing and manufacturing methods thereof.

2. Description of Related Art

Due to being lightweight and small in size, a display panel is favorable in the market of the portable displays and other displays with space limitations. To date, in addition to liquid crystal display (LCD), organic electro-luminescent display (OLED) and plasma display panel (PDP), a module of the optical interference display has been investigated.

Figure 1A:
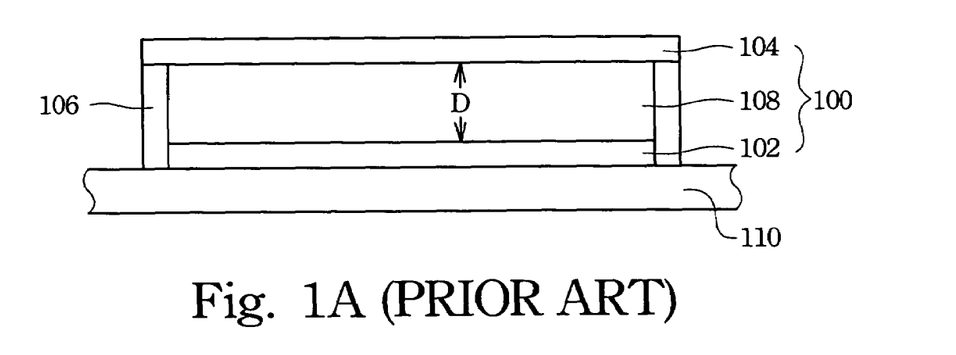
FIG. 1A illustrates a cross-sectional view of a prior art modulator.

U.S. Pat. No. 5,835,255 discloses a modulator array, that is, a color-changeable pixel for visible light which can be used in a display panel. FIG. 1A illustrates a cross-sectional view of a prior art modulator. Every modulator 100 comprises two walls, 102 and 104. These two walls are supported by posts 106, thus forming a cavity 108. The distance between these two walls, the depth of cavity 108, is D. The wall 102 is a light-incident electrode which, according to an absorption factor, absorbs visible light partially. The wall 104 is a light-reflective electrode that is flexed when a voltage is applied to it.

When the incident light shines through the wall 102 and arrives at the cavity 108, only the visible light with wavelengths corresponding to the formula 1.1 is reflected back, that is, $$2D = N\lambda \tag{1.1}$$

wherein N is a natural number.

When the depth of the cavity 108, D, equals one certain wavelength $\lambda_1$ of the incident light multiplied by any natural number, N, a constructive interference is produced, and a light with the wavelength $\lambda_1$ is reflected back. Thus, an observer viewing the panel from the direction of the incident light will observe light with the certain wavelength $\lambda_1$ reflected back at him. The modulator 100 here is in an "open" state.

Figure 1B:
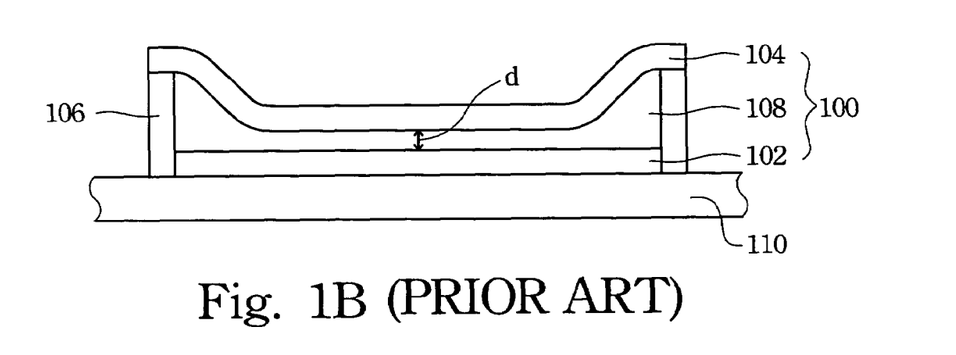
FIG. 1B illustrates a cross-sectional view of the modulator in FIG. 1A after a voltage is applied to it.

FIG. 1B illustrates a cross-sectional view of the modulator 100 in FIG. 1A after a voltage is applied to it. Under the applied voltage, the wall 104 is flexed by electrostatic attraction toward the wall 102. At this moment, the distance between the walls 102 and 104, the depth of cavity 108, becomes d and may equal zero.

The D in the formula 1.1 is hence replaced with d, and only the visible light with another certain wavelength $\lambda_2$ satisfying the formula 1.1 produces constructive interference in the cavity 108 and reflects back through the wall 102. However, in the modulator 100, the wall 102 is designed to have a high absorption rate for the light with the wavelength $\lambda_2$. Thus, the incident visible light with the wavelength $\lambda_2$ is absorbed, and the light with other wavelengths has destructive interference. All light is thereby filtered, and the observer is unable to see any reflected visible light when the wall 104 is flexed. The modulator 100 is now in a "closed" state.

As described above, under the applied voltage, the wall 104 is flexed by electrostatic attraction toward the wall 102 such that the modulator 100 is switched from the "open" state to the "closed" state. When the modulator 100 is switched from the "closed" state to the "open" state, the voltage for flexing the wall 104 is removed, and the wall 104 elastically returns to the original state, i.e. the "open" state, as illustrated in FIG. 1A.

Figure 2A:
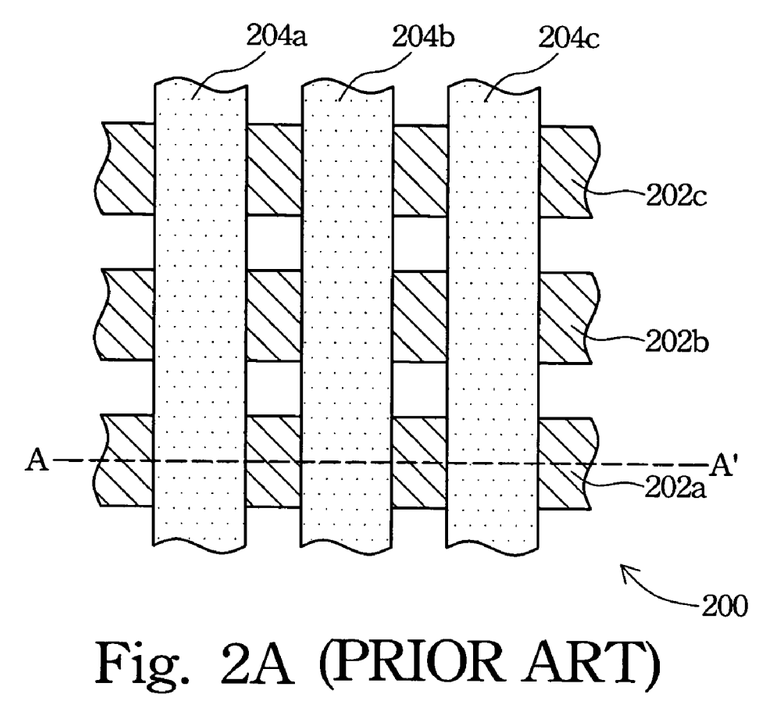
FIG. 2A illustrates a schematic view of a conventional optical interference reflective structure which is operated in a passive matrix mode.
Figure 2B:
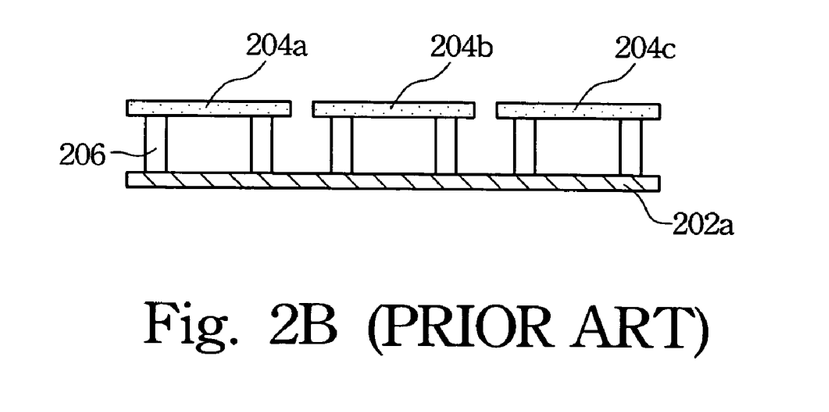
FIG. 2B illustrates a cross-sectional view taken along line AA' in FIG. 2A.

FIG. 2A illustrates a schematic view of a conventional optical interference reflective structure which is operated in a passive matrix mode. As illustrated in FIG. 2A, an optical interference reflective structure 200 is a portion of a display panel and comprises a plurality of optical interference reflective elements. The optical interference reflective elements are constructed from light-incident electrode lines 202a, 202b and 202c arranged in rows and light-reflective electrode lines 204a, 204b and 204c arranged in columns. FIG. 2B illustrates a cross-sectional view taken along line AA' in FIG. 2A, in which the three optical interference reflective elements made of the light-reflective electrode lines 204a, 204b, 204c and the light-incident electrode 202a are illustrated. As illustrated above, supports 206 are located between the light-reflective electrode lines 204a, 204b, 204c and the light-incident electrode 202a to form cavities, in which light is interfered.

Figure 3A:
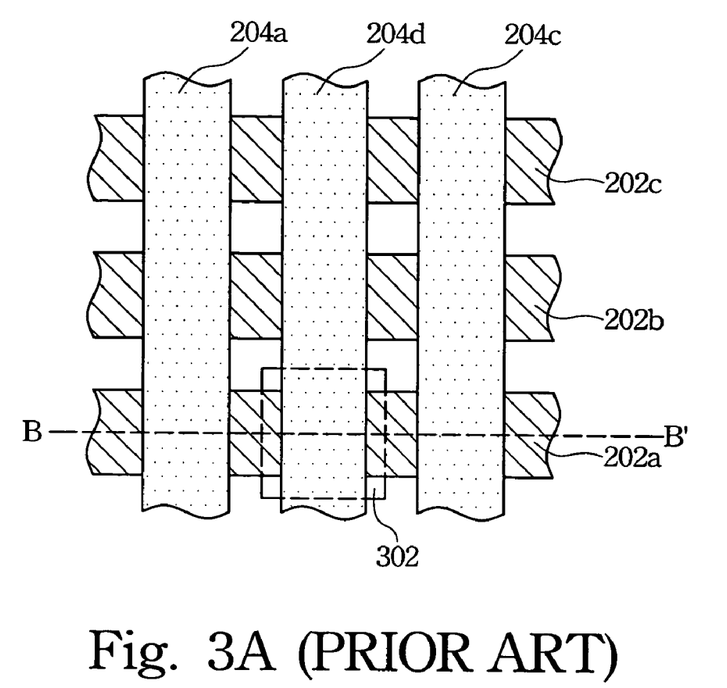
FIG. 3A illustrated a schematic view of another conventional optical interference reflective structure.
Figure 3B:
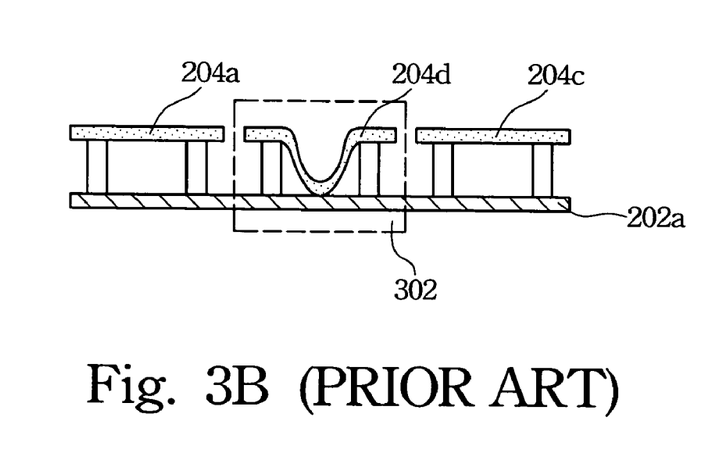
FIG. 3B illustrates a cross-sectional view taken along line BB' in FIG. 3A.

FIG. 3A illustrates a schematic view of another conventional optical interference reflective structure, in which an optical interference reflective structure 200 has a short-circuited optical interference reflective element 302. FIG. 3B illustrates a cross-sectional view taken along line BB' in FIG. 3A, which runs over the short-circuited optical interference reflective element 302. Because the conventional optical interference reflective elements are operated in the passive matrix mode, the potential differences for deforming the optical interference reflective element 302 is determined together by the potentials of the light-incident electrode line 202a and the light-reflective electrode line 204d.

The optical interference reflective element 302 is short-circuited due to a structural fault, such as a defect in a dielectric layer of the light-incident electrode line 202a positioned in the optical interference reflective element 302. The short-circuit causes an unnecessary voltage drop and further affects the potential differences of other optical interference reflective elements in the same column (the light-reflective electrode line 204d) or in the same row (the light-incident electrode line 202a), thus spoiling the display of the whole optical interference reflective structure.

SUMMARY

The conventional optical interference reflective structure operated in the passive matrix mode generally is composed of a plurality of optical interference reflective elements. The optical interference reflective elements are constructed from light-incident electrode lines and light-reflective electrode lines arranged perpendicularly. The differences of the potentials of the two electrode lines, the light-incident electrode lines and the light-reflective electrode lines, are the potential differences applied on the corresponding optical interference reflective elements constructed from them. Therefore, the electrode lines are used to switch the optical interference reflective elements.

However, if one optical interference reflective element is short-circuited, the short circuit will affect all the potential differences applied on the other optical interference reflective elements which are in the same column or the same row with the short-circuited optical interference reflective element. The affected optical interference reflective elements cannot be operated with the correct potential differences and therefore cause serious display problems.

It is therefore an objective of the present invention to provide an optical interference reflective structure in which connection parts of optical interference reflective elements are available for disconnection in order to avoid the short-circuited optical interference reflective elements from affecting the normally operating optical interference reflective elements.

It is another objective of the present invention to provide a method for repairing an optical interference reflective structure that disconnects the electrical connections between the short-circuited and normally operating optical interference reflective elements.

It is still another objective of the present invention to provide an optical interference reflective element of which at least one electrode has separate display and wiring parts. When the display part is short-circuited, the electrical connection between the display part and the wiring part can be disconnected, and thus the short-circuited optical interference reflective elements do not affect the normal operation of the whole optical interference reflective structure.

In accordance with the foregoing and other objectives of the present invention, an optical interference reflective element is provided. The optical interference element has a light-incident electrode and a light-reflective electrode. One or each of the two electrodes has a display part and a wiring part, and the display part and the wiring part are electrically connected with a connection part.

An optical interference reflective structure is formed by arranging and connecting the above-mentioned optical interference reflective elements as a matrix array. The light-incident electrodes of the optical interference reflective elements are electrically connected by the wiring parts thereof to form a plurality of first electrode lines; and the light-reflective electrodes of the optical interference reflective elements are electrically connected by the wiring parts thereof to form a plurality of second electrode lines. The first and second electrode lines are substantially arranged perpendicularly.

When the display part of any optical interference reflective element is short-circuited, the electrical connection of the display part and the wiring part can be disconnected, i.e. the connection part is cut off to avoid the short circuit of the single optical interference reflective elements from affecting the normally operating optical interference reflective elements arranged in the same column or in the same row.

According to one preferred embodiment of the present invention, the above-mentioned electrode, i.e. the electrode having the display part, the wiring part and the connection part, can be used as a light-incident electrode in addition to a light-reflective electrode of the optical interference reflective element. Moreover, the widths of the two electrodes are not limited; for example, the width of the light-incident electrode can be greater than the width of the light-reflective electrode, and contrariwise, the width of the light-incident electrode can be smaller than the width of the light-reflective electrode.

The optical interference reflective element can have more than one connection part. The connecting position of the display part and connection part is not limited and is available to be changed according to the needs of manufacturing processes and design. In addition, the connection part can be a bending line, which has at least one turning corner, and the turning corner is not limited to 90 degrees.

According to another object of the invention, the invention provides a method for repairing an optical interference reflective element. The optical interference reflective structure of the present invention is provided, of which every optical interference reflective element has a display part and a wiring part, and the display part and the wiring part are electrically connected with a connection part. When a faulty optical interference reflective element is identified from the optical interference reflective structure, such as the display part of one optical interference reflective element being short-circuited, the connection part of the faulty optical interference reflective element is disconnected, thus keeping the short-circuited display part from affecting the potential differences of other optical interference reflective elements in the same column or in the same row with the faulty optical interference reflective element.

The present invention provides an optical interference reflective structure and a method for repairing it. The separate display part and the wiring part are electrically connected with the connection part, such that when the display part is short-circuited, the connection part can be disconnected to avoid affecting other associated optical interference reflection elements. The optical interference reflective structure is simple and flexible to modify according to the needs of manufacturing processes or design, and therefore is a useful and low cost structure for a display panel.

It is to be understood that both the foregoing general description and the following detailed description are examples and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

In the optical interference reflective structure of the present invention, every optical interference reflective element thereof has an electrode made of a display part and a wiring part which are electrically connected to each other by a connection part. Moreover, the above-mentioned electrodes of the optical interference reflective elements are connected to form electrode lines by the wiring parts for operating in the passive matrix mode.

Figure 4A:
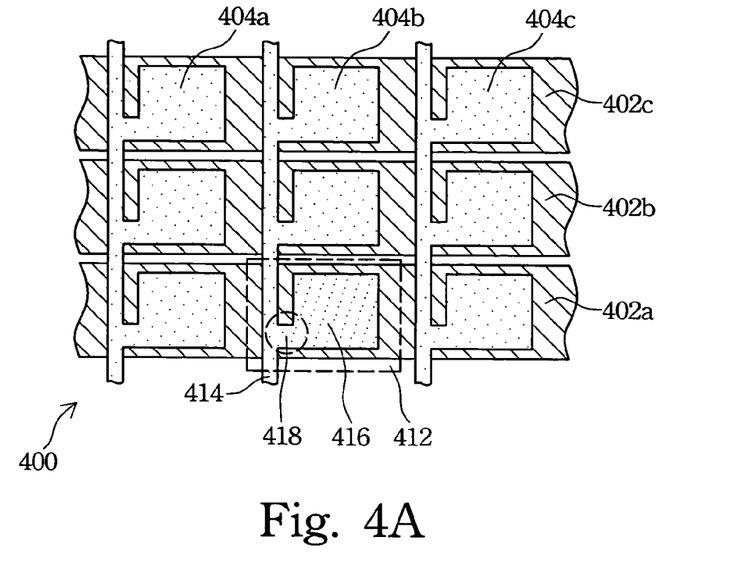
FIG. 4A illustrates a schematic view of one preferred embodiment of the invention.

FIG. 4A illustrates a schematic view of one preferred embodiment of the invention. An optical interference reflective structure 400 is a portion of a display panel and comprises a plurality of optical interference reflective elements 412. The optical interference reflective elements 412 are constructed from light-incident electrode lines 402a, 402b and 402c arranged in rows and light-reflective electrode lines 404a, 404b and 404c arranged in columns. The light-incident electrode lines 402a, 402b and 402c are strip-shaped.

As illustrated in FIG. 4A, in the optical interference reflective element 412, the light-reflective electrode has a display part 416 and a wiring part 414 which are electrically connected to each other by a connection part 418. Moreover, the light-reflective electrodes of two neighboring optical interference reflective elements in the same column (the light-reflective electrode line 404b) are connected to form the light-reflective electrode line 404b. In addition, in the preferred embodiment, the width of the light-incident electrode is greater than the width of the light-reflective electrode of the optical interference reflective element 412.

Figure 4B:
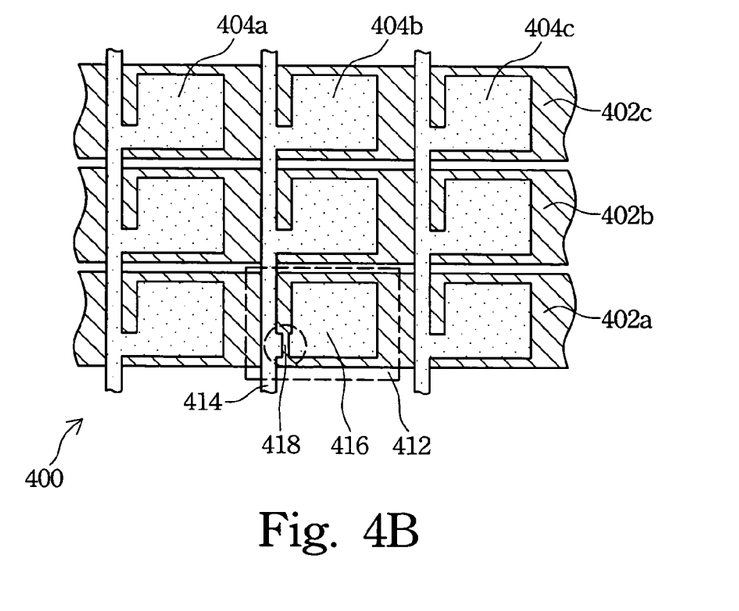
FIG. 4B illustrates a schematic view of the embodiment in FIG. 4A after disconnecting the connection part.

When the display part 412 of the optical interference reflective element 412 is identified as being short-circuited, the connection part 418 between the short-circuited display part 416 and the wiring part 414 is disconnected, as illustrated in FIG. 4B. The disconnection of the connection part 418 keeps the short-circuited display part 416 from affecting the potential differences of other optical interference reflective elements in the same column (the light-reflective electrode line 404b) or in the same row (the light-incident electrode line 402a) and further avoids the short-circuited display part 416 from spoiling the display of the whole optical interference reflective structure 400.

According to one preferred embodiment of the invention, a laser is used to cut the connection part 418. The laser cutting process is high power and available to focus on one point, and therefore prevents damaging neighboring and normal optical interference reflective elements during cutting. However, other disconnection processes offering precise cutting can also be used in the present invention. The present invention does not limit that the connection part 418 is disconnected only by the laser cutting process.

The electrode having the display part, the wiring part, and the connection part, besides being the light-reflective electrode as illustrated in FIG. 4A, can also be the light-incident electrode according to another embodiment of the present invention, and the light-reflection electrode lines in the embodiment are strip-shaped. In addition, some variations are illustrated as follows.

Figure 5A:
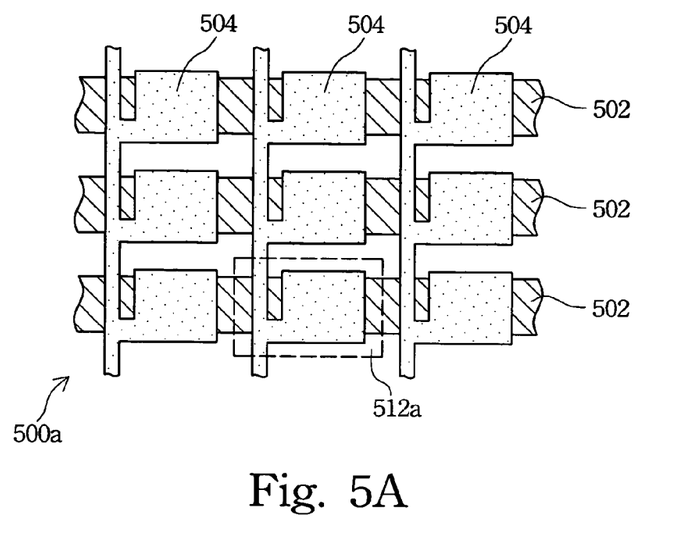
FIG. 5A illustrates a schematic view of another preferred embodiment of the invention.

FIG. 5A illustrates a schematic view of another preferred embodiment of the invention. The differences between the optical interference reflective structure 500a and 400 in FIGS. 5A and 4A include the width of the light-incident electrode line 502 being greater than the width of the light-reflective electrode line 504 of the optical interference reflection element 512a. FIGS. 4A and 5A explain that the invention does not limit the width of the electrode having the display part and the wiring part. The widths of the electrodes having the feature structures of the invention can be greater than, smaller than, or equal to the widths of other electrodes with or without the feature structures, such as the display part and the wiring part.

Figure 5B:
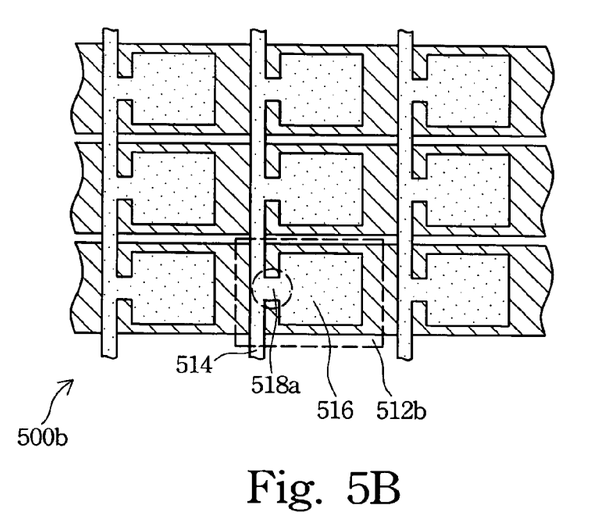
FIG. 5B illustrates a schematic view of another preferred embodiment of the invention.

FIG. 5B illustrates a schematic view of another preferred embodiment of the invention. The differences between the optical interference reflective structure 500b and 400 in FIGS. 5B and 4A include the position of the connection part 518a, which is electrically connected between the display part 516 and the wiring part 514, being positioned on the middle of the display part 516 of the optical interference reflection element 512b. FIGS. 4A and 5B explain that the invention does not limit the connecting position between the display part and the connection part. In other words, the connecting position of the electrode having the feature structures of the invention can be changed according to the needs of manufacturing processes or design.

Figure 5C:
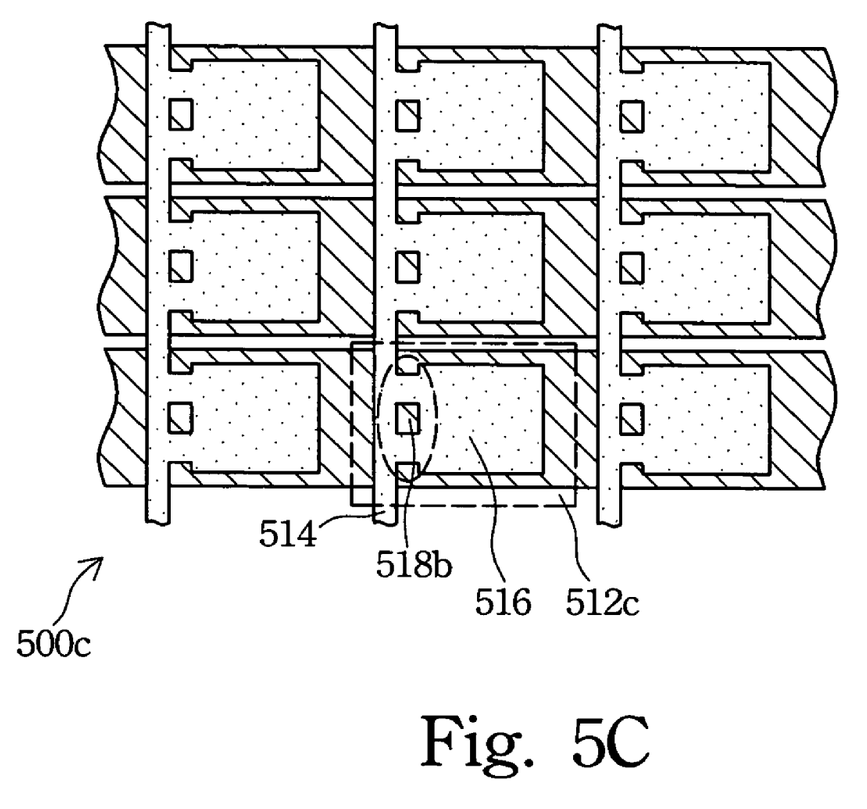
FIG. 5C illustrates a schematic view of another preferred embodiment of the invention.

FIG. 5C illustrates a schematic view of another preferred embodiment of the invention. The differences between the optical interference reflective structure 500c and 400 in FIGS. 5C and 4A include the quantity of the connection parts 518b, which are electrically connected between the display part 516 and the wiring part 514, being two in the optical interference reflection element 512c. FIGS. 4A and 5C explain that the invention does not limit the quantity of the connection parts. In other words, in the electrode having the feature structures of the invention, the connecting positions and the quantity of the connection parts can be changed and increased to enhance the connecting strength between the display part 516 and the wiring part 514.

Figure 6A:
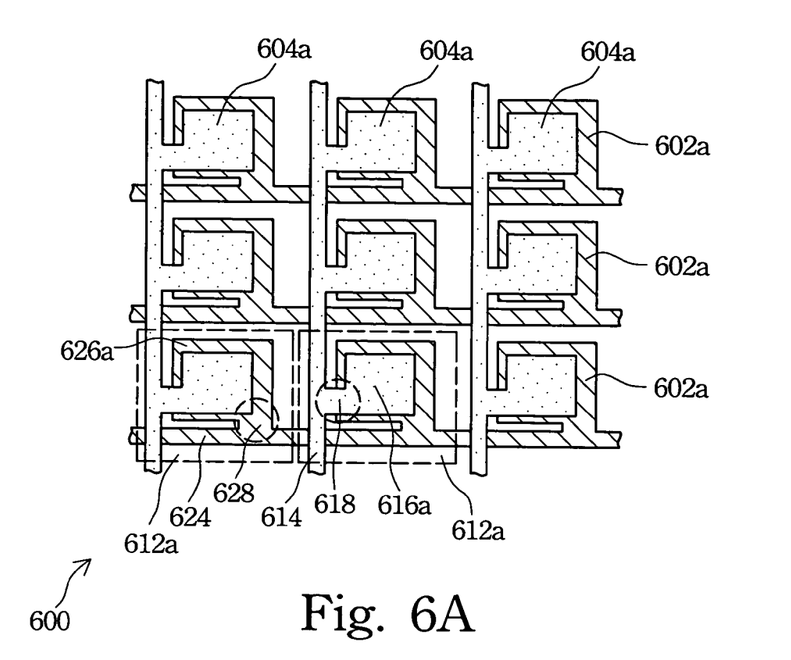
FIG. 6A illustrates a schematic view of another preferred embodiment of the invention.
Figure 6B:
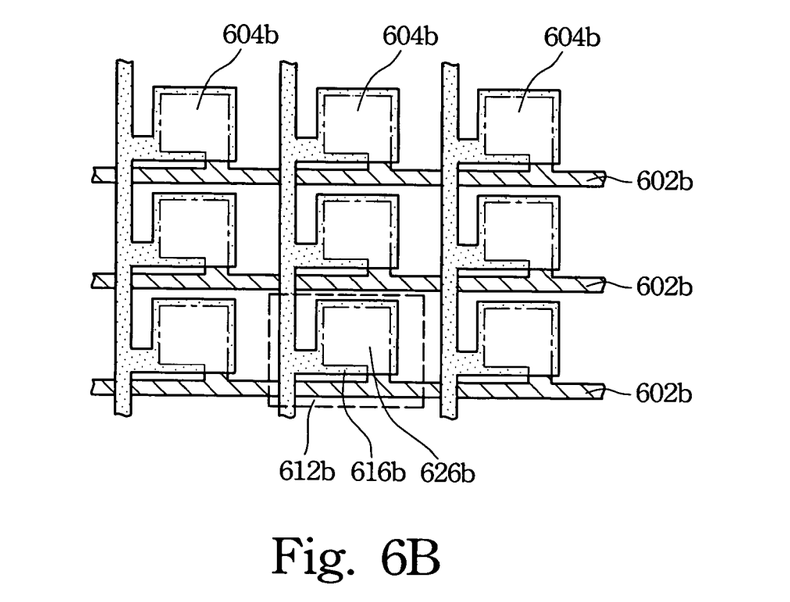
FIG. 6B illustrates a schematic view of another preferred embodiment of the invention.

FIGS. 6A and 6B illustrate schematic views of other embodiments of the invention. As described above, the electrodes having the feature structures of the invention can be used as the light-incident electrodes and/or the light-reflective electrodes in the optical interference reflective elements. These two embodiments illustrate that the light light-incident electrodes and the light-reflective electrodes both have the feature structures of the invention.

As illustrated in FIG. 6A, in an optical interference reflective element 612a, light-incident electrode lines 602a have display parts 616a, wiring parts 614 and connection parts 618, and light-reflective electrode lines 604a have display parts 626a, wiring parts 624 and connection parts 628. The widths of the display parts 626a are greater than the widths of the display parts 616a. FIG. 6B illustrates another embodiment in which the widths of display parts 616b of light-reflective electrode lines 604b are greater than the widths of display parts 626b of light-incident electrode lines 602b.

Figure 7A:
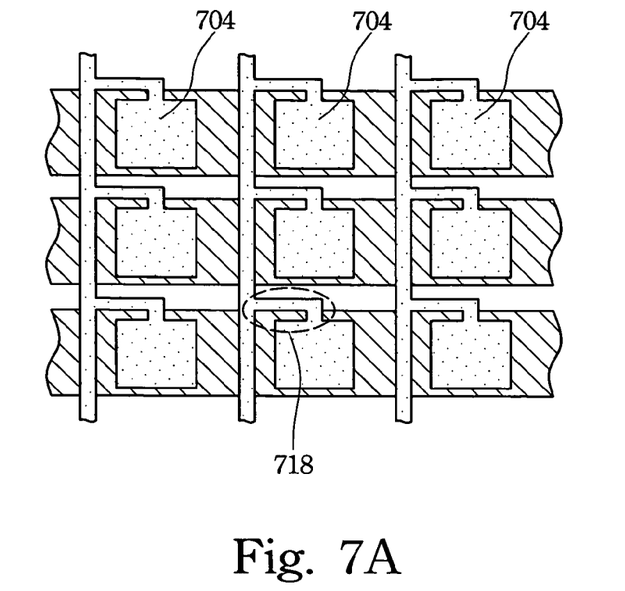
FIG. 7A illustrates a schematic view of another preferred embodiment of the invention.
Figure 7B:
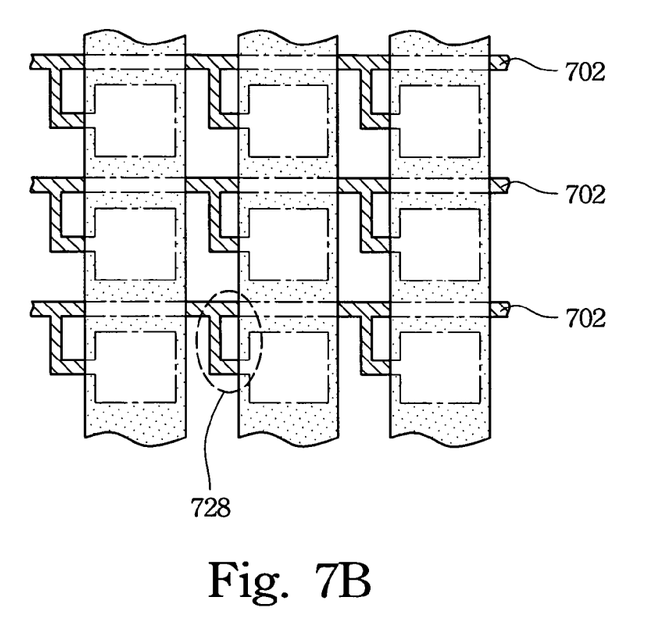
FIG. 7B illustrates a schematic view of another preferred embodiment of the invention.

The connection part of the foregoing embodiments, besides being a straight line, also can be a bending line according to the needs of the manufacturing processes or design. FIGS. 7A and 7B illustrate schematic views of connection parts of two embodiments of the invention. In FIG. 7A, connection parts 718 of light-reflective electrode lines 704 are bending lines. In FIG. 7B, connection parts 728 of light-incident electrode lines 702 are bending lines. The turning corners of these bending lines are not limited to right angles, and the quantities of the turning corners are not limited to only one as illustrated in FIGS. 7A and 7B. In other words, one connection part having several turns also falls within the scope of the invention.

The following descriptions simply interpret the manufacturing of the optical interference reflective structure of the invention by using the optical interference reflective structure 600 as illustrated in FIG. 6A. First, the light-incident electrode lines 602a are formed on a substrate, such as a transparent substrate. Each of the light-incident electrode lines 602a are patterned to a plurality of light-incident electrodes, and each of the light-incident electrodes has the display part 616a, the wiring part 614 and the connection part 618. The neighboring light-incident electrodes which are in the same row are electrically connected with their connection part 616a to form a first electrode line, i.e. the light-incident electrode line 602a.

A sacrificial layer is then formed on the first electrode lines. The sacrificial layer may be made of transparent materials such as dielectric materials, or be made of opaque materials such as metal materials, polysilicon or amorphous silicon (a-Si). Openings are formed in the first electrode lines and the sacrificial layer suitable for forming supports therein. For example, a photolithographic etching process is used to form openings in the first electrode lines and the sacrificial layer, and every opening is suitable for forming a support therein.

Next, a material layer is formed in the sacrificial layer and fills the openings. The material layer is suitable for forming supports and generally uses photosensitive materials such as photoresists, or non-photosensitive polymeric materials such as polyester, polyamide or the like. If the non-photosensitive materials are used for forming the material layer, an additional photolithographic etching process is required to define supports in the material layer.

Light-reflective electrode lines 604a are formed on the sacrificial layer and the supports. Each of the light-reflective electrode lines 604a is patterned to a plurality of light-reflective electrodes, and each of the light-reflective electrodes has the display part 626a, the wiring part 624 and the connection part 628. The neighboring light-reflective electrodes which are in the same column are electrically connected with their connection part 626a to form a second electrode line, i.e. the light-reflective electrode line 604a.

Finally, the sacrificial layer is removed by a release etching process, such as a remote plasma etching process, to form cavities (located in the original position of the sacrificial layer). The remote plasma etching process etches the sacrificial layer with a remote plasma produced by an etching reagent having a fluorine group or a chlorine group, such as CF4, BCl3, NF3, or SF6, as a precursor. Thus, the optical interference reflective structure 600 as illustrated in FIG. 6A is accomplished.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical interference reflective structure, comprising:
   a plurality of optical interference reflective elements, wherein each of the optical interference reflective elements comprises:
      a first electrode having a first display part, a first wiring part and at least one first connection part, wherein the first display part is electrically connected to the first wiring part with the first connection part;
      a second electrode; and
      a support located between the first electrode and the second electrode to form a cavity;
   wherein the first electrodes are electrically connected by the first wiring parts to form a plurality of first electrode lines.

2. The optical interference reflective structure of claim 1, wherein each of the second electrodes comprises a second display part, a second wiring part and at least one second connection part, the second display part is electrically connected to the second wiring part with the second connection part, and the second electrodes are electrically connected by the second wiring parts to form a plurality of second electrode lines.

3. The optical interference reflective structure of claim 1, wherein the first connection part is a bending line.

4. A method for manufacturing an optical interference reflective structure, comprising:
   providing a substrate;
   forming a plurality of first electrodes on the substrate, wherein the first electrodes are electrically connected to form a plurality of first electrode lines;
   forming a sacrificial layer on the first electrodes;
   forming a plurality of first openings in the first electrodes and the sacrificial layer;
   forming a support in each of the first openings;
   forming a plurality of second electrodes on the sacrificial layer and the supports, wherein each of the second electrodes comprises a first display part, a first wiring part and at least one first connection part, the first display part is electrically connected to the first wiring part with the first connection part, and the second electrodes are electrically connected by the first wiring parts to form a plurality of second electrode lines; and
   removing the sacrificial layer by a release etching process.

5. The method of claim 4, wherein each of the first electrodes comprises a second display part, a second wiring part and at least one second connection part, the second display part is electrically connected to the second wiring part with the second connection part, and the first electrodes are electrically connected by the second wiring parts to form the first electrode lines.

6. The method of claim 4, wherein the first connection part is a bending line.

7. A method for manufacturing an optical interference reflective structure, comprising:
   providing a substrate;
   forming a plurality of first electrodes on the substrate, wherein each of the first electrodes comprises a first display part, a first wiring part and at least one first connection part, the first display part is electrically connected to the first wiring part with the first connection part, and the first electrodes are electrically connected by the first wiring parts to form a plurality of first electrode lines;
   forming a sacrificial layer on the first electrodes;
   forming a plurality of first openings in the first electrodes and the sacrificial layer;
   forming a support in each of the first openings;
   forming a plurality of second electrodes on the sacrificial layer and the supports, wherein the second electrodes are electrically connected to form a plurality of second electrode lines; and
   removing the sacrificial layer by a release etching process.

8. The method of claim 7, wherein each of the second electrodes comprises a second display part, a second wiring part and at least one second connection part, the second display part is electrically connected to the second wiring part with the second connection part, and the second electrodes are electrically connected by the second wiring parts to form the second electrode lines.

9. The method of claim 7, wherein the first connection part is a bending line.

10. A method for repairing an optical interference reflective structure, the optical interference reflective structure having a plurality of optical interference reflective elements, wherein each of the optical interference reflective elements has a first electrode and a second electrode, each of the second electrodes has a display part, a wiring part and at least one connection part, the display part is electrically connected to the wiring part with the connection part, and the second electrodes are electrically connected by the wiring parts to form a plurality of electrode lines, the method comprising:

identifying a faulty optical interference reflective element from the optical interference reflective structure; and disconnecting the connection part of the faulty optical interference reflective element.

11. The method of claim 10, wherein the method uses a laser to cut the connection part of the faulty optical interference reflective element.

12. An optical interference reflective structure, comprising:

a plurality of first wirings;

a plurality of first electrodes, wherein each of the first electrodes has a first display part and a first connection part, the first display parts are electrically connected to the corresponding first wirings by the first connection parts to form a plurality of first electrode lines;

a plurality of second electrodes, electrically connected to form a plurality of second electrode lines; and a plurality of supports, located between the first electrodes and the second electrodes to form a plurality of optical interference reflective elements.

13. The optical interference reflective structure of claim 12, further comprising:

a plurality of second wirings, wherein each of the second electrodes has a second display part and a second connection part, the second display parts are electrically connected to the corresponding second wirings by the second connection parts to form a plurality of second electrode lines.

14. The optical interference reflective structure of claim 12, wherein the first connection part is a bending line.

* * * * *